United States Patent [19]
Appel et al.

[11] Patent Number: 5,659,414
[45] Date of Patent: Aug. 19, 1997

[54] MEANS FOR CONTROLLING THE POWER OUTPUT OF LASER DIODES IN A ROS SYSTEM

[75] Inventors: James J. Appel, Rochester; Aron Nacman, Penfield; Robert H. Melino, Webster, all of N.Y.

[73] Assignee: Xerox Corporation, Stamford, Conn.

[21] Appl. No.: 492,504

[22] Filed: Jun. 20, 1995

[51] Int. Cl.$^6$ .................................................. G02B 26/08
[52] U.S. Cl. ........................ 359/196; 359/212; 359/216; 359/204; 250/205
[58] Field of Search ........................... 359/204, 212–219, 359/618, 629, 196; 347/233, 236, 246, 258–261; 250/205

[56] References Cited

U.S. PATENT DOCUMENTS

| | | | |
|---|---|---|---|
| 4,796,961 | 1/1989 | Yamada et al. | 359/204 |
| 4,796,964 | 1/1989 | Connell et al. | 359/217 |
| 5,233,175 | 8/1993 | Latta et al. | 250/205 |

*Primary Examiner*—James Phan

[57] ABSTRACT

The present invention provides a means and method for efficiently and automatically monitoring and adjusting the power output of either a single or a dual beam laser diode array used to provide the scanning beams in a ROS system. Collimated light outputs from a collimator lens assembly following either a single or dual beam laser are reflected along an optical path to impinge on one or two photodiodes positioned so as to intercept the reflected light. The photodiode output is proportional to the power output of the laser diode associated with the photodiode. In one multi-beam embodiment, polarization of the laser diode output is controlled so as to ensure that only outputs from an associated laser diode is sensed by an associated photodiode. In another embodiment, a half wave plate is used to rotate the polarization of one of the laser diodes.

4 Claims, 7 Drawing Sheets

FIG. 5
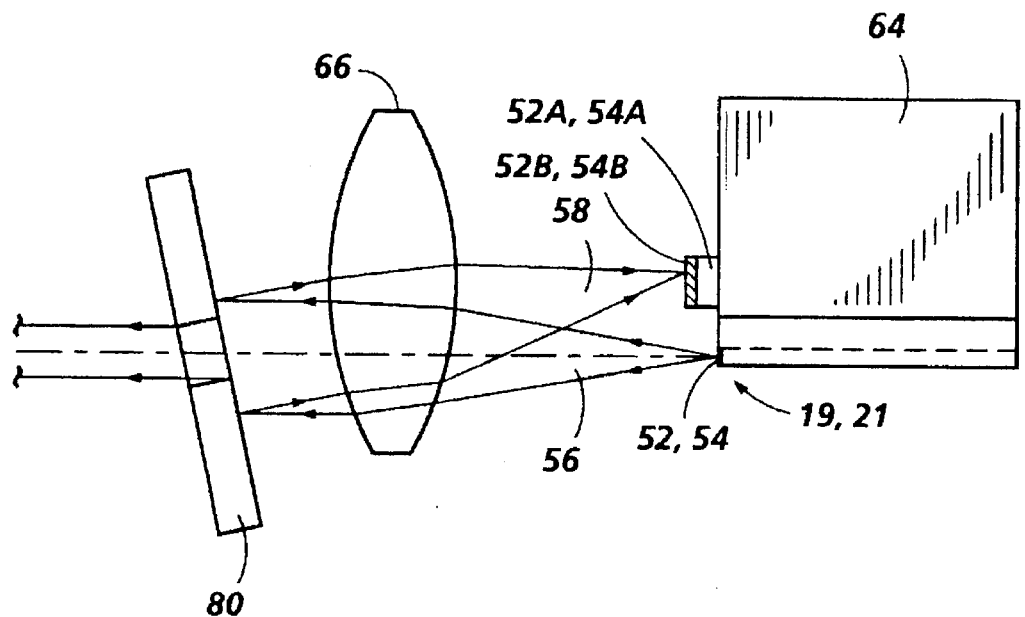
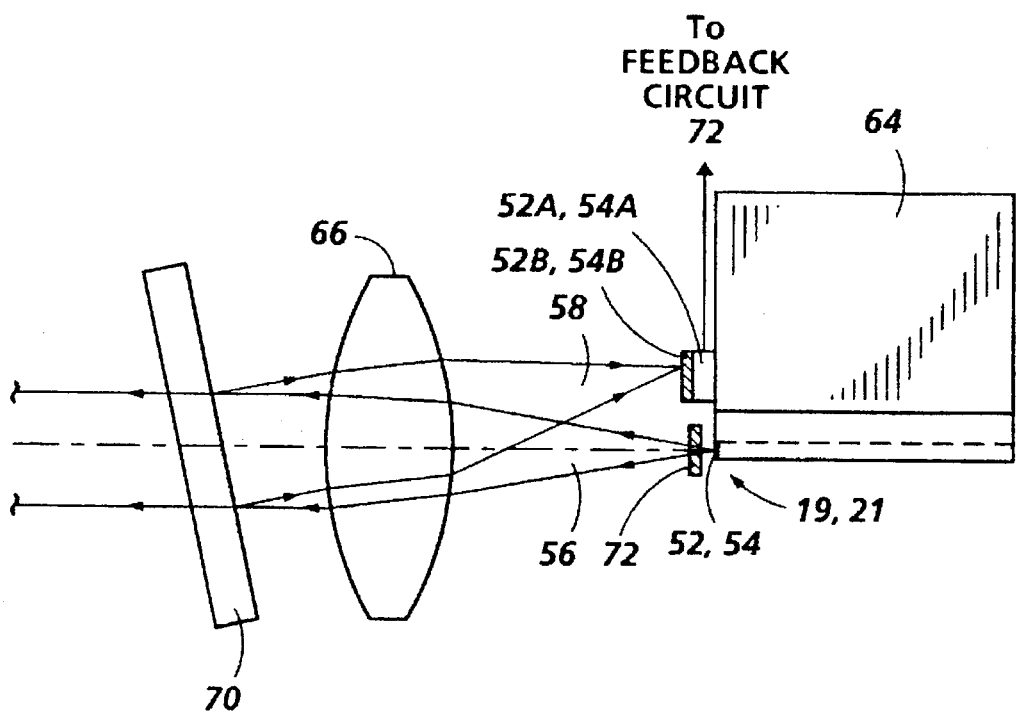
FIG. 6

MEANS FOR CONTROLLING THE POWER OUTPUT OF LASER DIODES IN A ROS SYSTEM

BACKGROUND AND DISCLOSURE STATEMENT

The present invention relates generally to the monitoring of output power of a semiconductor laser diode and, particularly, to the monitoring of the output power of a dual beam laser diode used in a Raster Output Scanning (ROS) system.

It is well known in the scanning art to use laser diodes to generate a coherent laser beam which is optically shaped and used to scan in a ROS system. It is also known to use multiple laser diodes to create multiple beams, each individual beam independently modulated by video signals, and the multiple beams scanned onto the recording surface as modulated beams. For these multiple beam applications, it has been found advantageous to use arrays of closely spaced laser diodes. Closely spaced diodes allow for multiple beam processing and thus improve data throughput as compared with systems that employ continuous wave, single beam gas or laser diodes.

Typically, the laser diodes in a multiple beam system are individually addressable. Individual addressability generally requires that each diode have a separate current source that drives or modulates the diode. In operation, each driver sends a current through the diode sufficient to induce emission of laser light. The amount of current the driver produces is determined, in part, by the digital input data driving that particular lasing element. An example of a Raster Output Scan (ROS) system using a dual laser diode is disclosed in U.S. Pat. No. 4,796,964, whose contents are hereby incorporated by reference.

Because different laser diodes have different output power characteristics in response to a given driving current, it is desirable to monitor the amount of output power from each laser diode.

The requirement imposed on output power monitoring is that the light output from a first diode must be detected independent of the light output of the second diode. One prior art method for monitoring and controlling the output power of dual beam laser diodes is to detect radiation emitted from the back facet of each laser diode as shown in FIG. 1.

FIG. 1 shows a side schematic view of a prior art ROS system utilizing back facet detection feedback for controlling the diode output. Input video data is transmitted to a self-modulating light source 12, such as a low powered solid state laser diode, which produces a modulated diverging beam of coherent light. The diode is driven in accordance with image signals entered into and processed by ESS 17. The beam is collimated by a spherical collimating lens 14 and is next incident upon a cylindrical lens 15 which focuses the light to a line image in the fast scan direction onto a rotating polygon 20 having at least one mirrored facet 21. The rotation of the mirrored facets causes the beam to be deflected and thereby scanned across a photosensitive image member which is shown as a photoreceptor drum 24. Postscan optics system 22 reconfigures the beam reflected by facet 21 to a circular or elliptical cross-section, refocuses the beam to the proper point on the surface of drum 24, and corrects for scan nonlinearity (f-theta correction). A 1X (or other working magnification) toroidal lens 28 or cylinder mirror (not shown) is disposed between the scanning device 20 and the photoreceptor 24 to correct for wobble (scanner motion or facet errors) where appropriate.

The laser diode 12 has front and back facets. While the majority of the laser light escapes from the front facet, some radiation is emitted from the back facet of the diode. This radiation is detected by a photodiode 32 which generates output signals which are sent into feedback circuit 44. This signal is compared to a predetermined voltage level corresponding to the desired power output of the laser diode. If correction is needed, a signal is sent to the laser diode drive circuit to increase or reduce the emitter power output.

There are several problems with this prior art system. One is a slow response time of the detection and feedback system which makes real time, pixel by pixel control which is necessary to eliminate exposure variations along the scan line impossible at high printing rates. Adding to the real time control problem is the restriction of a single photodiode monitoring the output from one of the laser diodes while the other laser diode is being modulated. These problems, inherent in a back facet detection system, have been addressed in U.S. Pat. No. 5,600,126, issued on Feb. 4, 1997 and assigned to the same assignee as the present invention. In this application, two back facet photodiodes were used. The polarization of the laser diode back facet light output was controlled so that each photodiode would be separately and simultaneously measuring the light intensity of the associated laser diode. A preferred feedback circuit was also described which provided a fast response time and an improved control of each laser diode output power level.

While the back facet detection power output control method provides satisfactory results, one disadvantage is the need for very accurate calibration of the photodiodes since they are detecting only a small fraction (about 0.5%) of the total laser diode output. It would be desirable to control the laser diode output power levels by using photodiodes positioned in the output beam path of each laser diode, that is in the path of the light emitted out of the front facet of the laser diode. This implementation would require isolation of each photodiode, both from the laser diode not being instantly monitored as well as stray light from optical components located in the pre-polygon optical system.

Thus, there is a need to construct an output power detection system such that the amount of light emitted from individual emitters, in a multiple laser diode configuration, is detected by corresponding photodiodes.

It is thus a first object of the present invention to provide a monitoring system such that the amount of output power from individual emitters of laser diodes can be individually monitored in a continuous fashion with a relatively fast response time.

It is a further object of the invention to reduce the effects of stray light interference on photodiodes positioned in the pre-polygon optical system.

These and other objects are realized by positioning two small photodiodes relatively close to the front or emitting end of the laser diodes being monitored. An optical element is positioned in the pre-polygon optical system so as to reflect a portion of the laser diode output radiation back towards the photodiodes. In one embodiment, the photodiodes are mounted on the laser diode heat sink assembly and light is reflected back onto the photodiodes by a tilted beam splitter.

In another embodiment, the photodiodes are positioned adjacent to the collimator lens and light is reflected back to the photodiodes by an angled, curved aperture plate. More particularly, the present invention is related to a scanning optical system for scanning an image plane with a modulated laser beam from at least one laser diode, the laser diode providing a modulated output beam at a predetermined power level, the output beam collimated by a collimator lens and scanned by a beam scanner through beam shaping optics and onto the imaging plane, the scanning optical system further including monitoring means for monitoring and adjusting the laser diode power level, said monitoring means including:

an optical reflective element positioned between the collimator lens and the beam scanner so as to reflect a portion of collimated light back towards the laser diodes, detector means positioned so as to intercept at least a portion of said light reflected from said optical reflector element and to generate an output signal related to the amount of detected light, and feedback circuit means for monitoring the photodiode output signals and for adjusting the laser diode output so as to maintain the output at said predetermined power level.

BRIEF DESCRIPTION OF THE DRAWINGS

FIG. 5 is a top view of a second embodiment of the invention showing a tilted aperture plate reflecting light back towards two photodiodes positioned next to the laser diode array.

FIG. 6 shows a top view of a third embodiment of the invention, wherein the output polarization of one of the emittors is rotated by a one-half wave plate.

DESCRIPTION OF THE INVENTION

The following description is presented to enable any person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Figure 2:
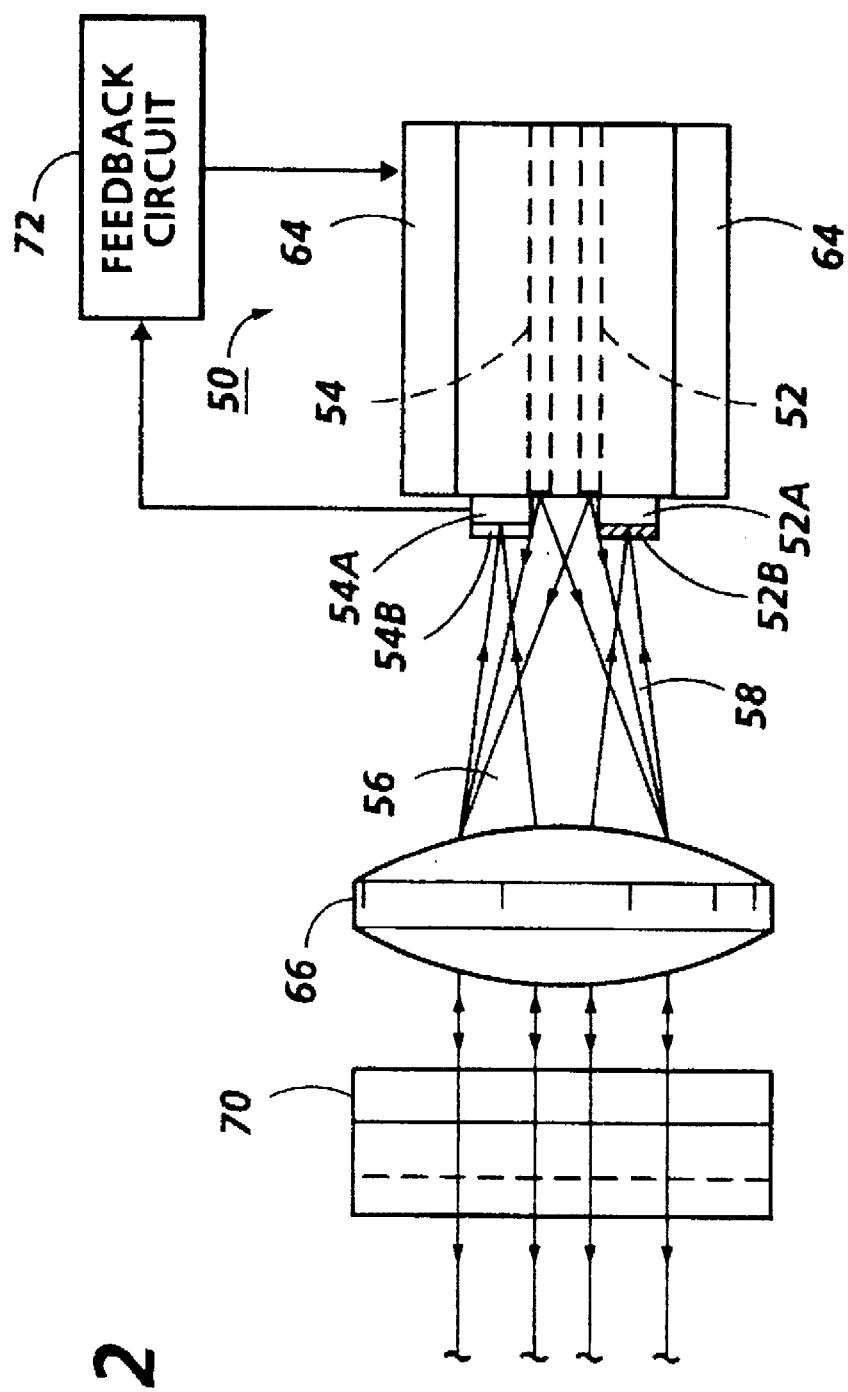
FIG. 2 shows a side view of a first embodiment of the invention wherein two photodiodes are used in conjunction with a beam splitter reflecting light back along the optical path towards the photodiodes.
Figure 3:
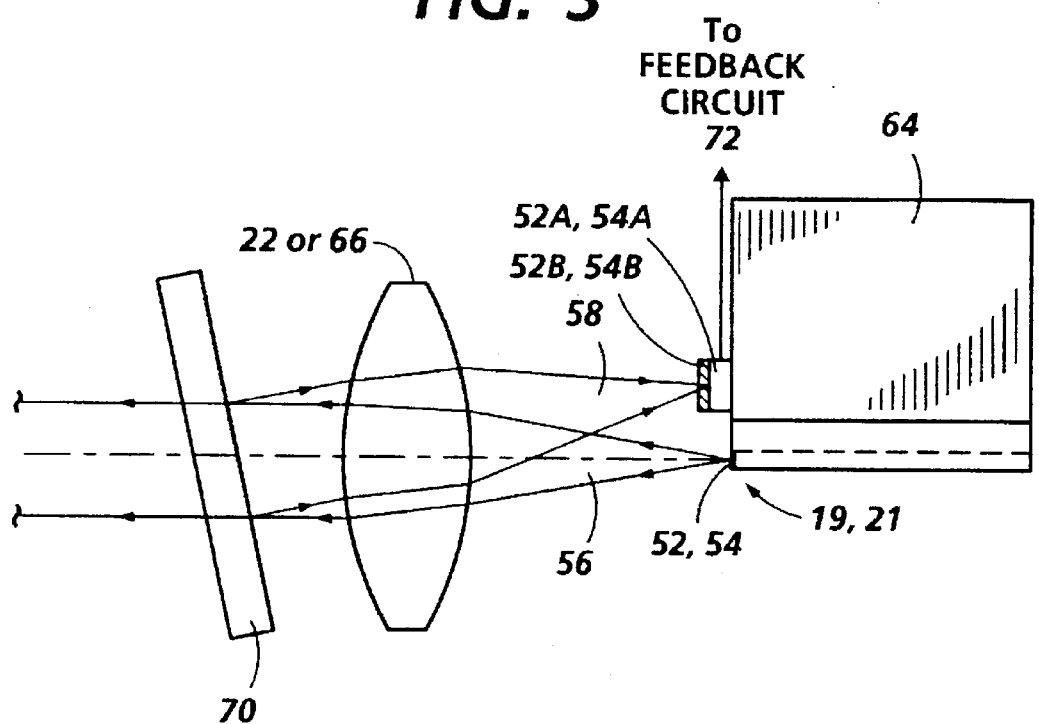
FIG. 3 is a top view of a portion of the detecting system of FIG. 2.
Figure 4:
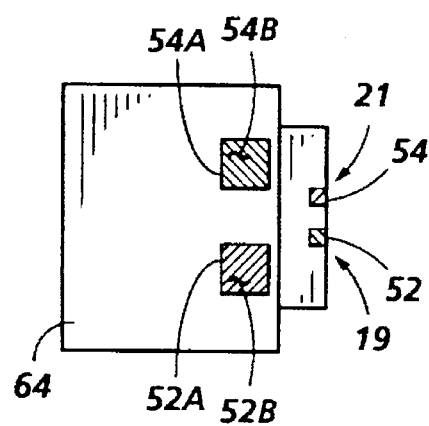
FIG. 4 is a front end view of FIG. 3 showing the location of the laser diodes and the photodiodes positioned next to them.

Referring to FIGS. 2, 3 and 4, a side, top and front view, respectively, shows one embodiment of the present invention An array 50 is comprised of laser diodes 52, 54. Array 50 can be used to provide beams 56, 58 used for beam scanning purposes in a ROS system of the type disclosed, for example, in U.S. Pat. No. 4,796,964. Two photodiodes 52A, 54A are mounted on the front face of heat sink 64 out of the plane of the page in FIG. 2 as shown in FIG. 3. The two photodiodes 52A, 54A, in a preferred embodiment, are similar in size and response time to a Motorola MRD 500 detector (0.025 mm$^2$). The distance from the laser diodes 52, 54 to a line to the center of photodiodes 52A, 54A is about 1.0 mm. Output beams 56, 58 are collimated by collimation lens 66. Inserted between lens 66 and the scanner 68 is a partially reflecting beam splitter mirror 70. Mirror 70 is tilted at an angle of about 5.7 degrees to reflect part of the collimated beam back through lens 66 at an angle such as to re-image the light from the laser diodes 52, 54 onto photodiode 52A, 54A. Photodiodes 52A and 54A are spaced several mm away from the front face of the heat sink 64. Thus, when the light reflected by the beam splitter is re-imaged on the photodiodes it will be sufficiently out of focus to illuminate both photodiodes with light from both laser diodes.

The output of laser diode 52 for this embodiment is polarized vertically and the output of diode 54 is polarized horizontally. A polarizer is placed over each of the photodiodes. Polarizer 52B over photodiode 52A has its axis of transmission parallel to the direction of polarization of the beam emitted from laser diode 52; i.e., vertical. Polarizer 54B over photodiode 54A has its axis of transmission parallel to the direction of polarization of the beam emitted from laser diode 54; i.e., horizontal. This configuration prevents the output beam from laser diode 52 from reaching photodiode 54A and the beam from laser diode 54 from reaching photodiode 52A. This configuration can be used with a monolithic dual laser diode whose beams can be polarized vertically or horizontally and also with hybrid dual diode pairs which are orthogonally polarized. The fraction of light which must be reflected by the beam splitter 70 is chosen to provide an adequate signal out of the photodiodes 52A, 54A without the need for another focusing lens.

Each photodiode 52A, 54A is reversed biased with the cathode at a positive voltage (+Vcc), and the feedback circuit 72, can be built into the laser diode package configuration. An exemplary feedback circuit is disclosed in the aforementioned U.S. Pat. No. 5,600,126.

This arrangement collects an appreciable fraction of the emitted light from each laser diode; the maximum sensitivity of each photodiode is thus realized. Since each laser diode output is detected by a separate photodiode, the output of each laser diode can be detected independent of the other.

Thus, each photodiode 52A, 54A generates an output signal which is proportional to the power output of diodes 52, 54, respectively. Orthogonally oriented polarizers prevent any stray light from being detected.

In the embodiment shown in FIGS. 2–4, the exacting alignment requirements between the photodiodes and the laser diodes can be relaxed by causing the reflected light from beam splitter 70 to overfill the diodes. The collimated lens 66 is designed to be large enough in diameter and field angle to transmit and focus the returning beam. The focus of the light on the photodiodes should be perfect. In fact, the light distribution on the photodiode should be significantly out of focus in order to overfill the photodiodes and avoid the need for precise alignment. Even with the overfilled, out of focus condition, most of the light reflected by beam splitter 70 will illuminate the photodiodes. Thus, the irradiance level of the photodiodes will be much higher than if the photodiodes were positioned adjacent to the optical aperture looking back at the front facet of the laser diodes, and thus an adequate signal will be obtained from each photodiode.

Alternately, as shown in FIG. 5, the beam splitter is replaced with an aperture plate 80. Plate 80 is essentially a mirror with a transparent window serving as the aperture. Plate 80 is mounted at a slight angle to the optical axis and will reflect the light not passing through the optical system aperture back to the collimator lens at a slight angle. The reflective side of plate 80 can have either a flat surface or a convex spherical curvature. If the reflective side of plate 80 is flat, the photodiodes must be positioned far enough to the left of the laser diode emitting apertures in FIG. 5 to assure that the returning beam from the aperture plate overfills both photodiodes with light emitted from both lasers. If the reflective side of plate 80 has a spherical curvature the radius of curvature of this surface is designed to defocus the beam at the photodiodes to assure that both photodiodes are overfilled with light emitted from both lasers. The collimator lens will focus the light onto the photodiodes. The collimator lens is designed to be large enough in diameter to transmit and focus the returning beams.

Figure 7:
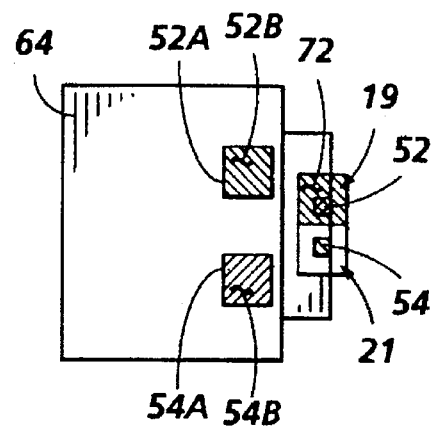
FIG. 7 is a front end view of FIG. 6.

In another variation of the embodiment of FIGS. 2-4, the output of laser diodes 52, 54, where 54 is positioned out of the plane of the page in FIG. 6 and 7, are both polarized parallel to the plane of the page in FIG. 6. In order to effect beam detection separation of each of the photodiodes 52A, 54A the following changes are made. Referring to FIGS. 6 and 7, a half wave plate 72 is positioned very close to the output surface of laser diode 52 with its principle plane angle at 45° to the direction of polarization of the laser diode. This half wave plate must be positioned very close to laser diode 52 so that it does not intercept the beam emitted by laser diode 54. A transparent substrate could be used that has a liquid crystal half wave coating on half of its surface. A polarizer is positioned over each of the photodiodes 52A, 54A. The polarizer 52B over photodiode 52A has its axis of transmission perpendicular to the plane of the page. The polarizer 54B over photodiode 54A has its axis of transmission vertical parallel to the plane of the page. As is well know, the direction of polarization of the beam emitted by laser diode 52 is rotated 90° by the half wave plate, thus making it perpendicular to the plane of the page and parallel to the transmission axis of polarizer 52B. This configuration prevents the beam from laser diode 52 from reaching photodiode 54A, and the beam from laser diode 54 from reaching photodiode 52A. The output from photodiodes 52A, 54A is then sent back to feedback circuit 72 to control the output levels of laser diodes 52, 54 respectively. The configuration will work with monolithic dual diodes, as shown, and also with hybrid dual diode pairs. It will also work with laser diode pairs which are both polarized perpendicular to the plane of the page.

Figure 8:
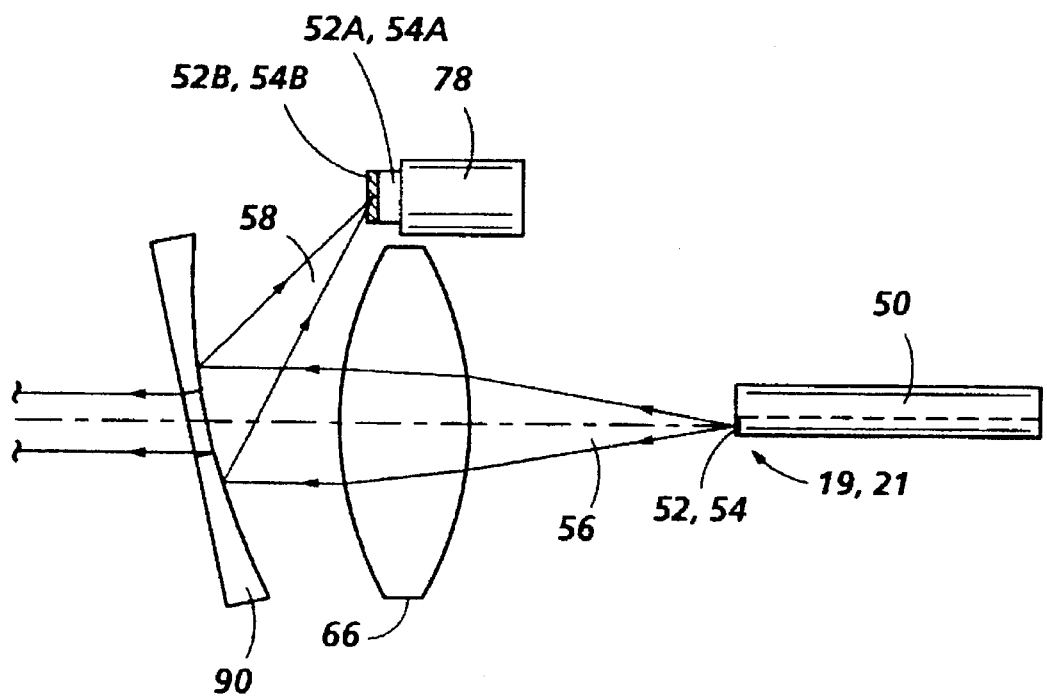
FIG. 8 shows a top view of another embodiment of the present invention wherein an aperture plate is placed in the optical path to reflect light back to photodiodes positioned adjacent to the collimator lens.
Figure 9:
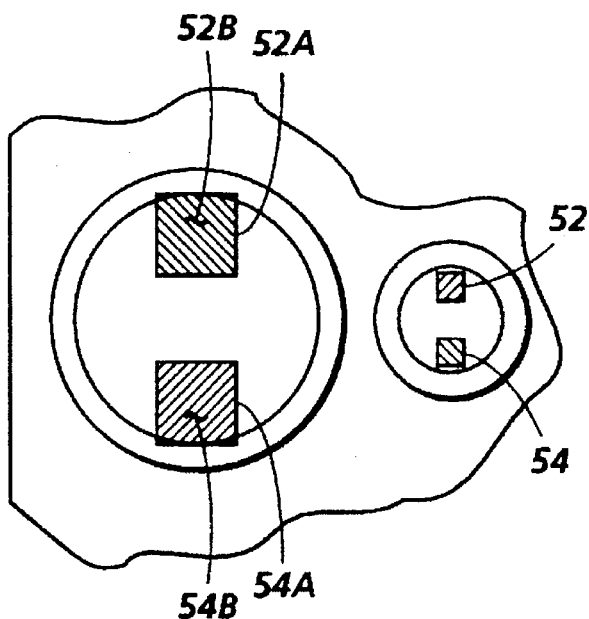
FIG. 9 shows a front end view of FIG. 8.

FIGS. 8 and 9 show another embodiment of a dual beam laser diode output power monitoring arrangement. For this embodiment, the two detecting photodiodes are physically removed from a location adjacent to the laser diode in a plane near the laser diodes and moved to a position adjacent to the collimator lens. Instead of a beam splitter 70, a curved aperture plate 90 is used to reflect and focus a portion of the emitted light back towards the photodiodes.

Referring to FIG. 8, a top view and FIG. 9, a front end view, the two photodiodes 52A, 54A are assembled on assembly 78 separated from the laser diode array 50. A preferred location for assembly 78 is adjacent to the collimator lens 66. Aperture plate 90 is a curved metallic mirror with a transparent cut out serving as the aperture with the rest of the mirror surface facing the collimator lens covered with a highly specularly reflective coating. Plate 90 is mounted at a slight angle to the optical axis and will reflect the light not passing through the aperture back towards the photodiodes. The laser diode output polarization is the same as for the FIGS. 2-4 embodiment, e.g., laser diode 52 is polarized parallel to the plane of the page and laser diode 54 output is polarized perpendicular to the plane of the page. Thus, photodiodes 52A, 54A and associated polarizers 52B, 54B, formed as shown in FIG. 3, to transmit light only from the associated laser diode being monitored.

To summarize the invention up to this point, several embodiments of a means for monitoring and adjusting the output power of dual laser diode arrays have been described. Each embodiment utilizes a reflective element in the optical path to reflect light back towards the light source to impinge on a pair of photodiodes mounted either adjacent to the heat sink supporting the laser diode array or, in another embodiment, to photodiodes located adjacent to the collimator lens. In the embodiments shown in FIGS. 2-4, a tilted beam splitter is the optical reflective element; separation of light from each laser diode being monitored is achieved by providing appropriate polarization coatings to the photodiodes, The photodiode outputs are then sent through a feedback circuit which produces the proper output adjustment signals to the appropriate laser diodes. The light impinging on the photodiodes overfills the photodiodes.

The reflective element can be a tilted aperture plate as shown in FIG. 5. FIGS. 6 and 7 show another embodiment where a half wave plate is used to change the polarity of one of the laser diode output beams. FIGS. 8 and 9 show an embodiment where the photodiodes are moved physically closer to the element which is reflecting the light backwards.

Figure 1:
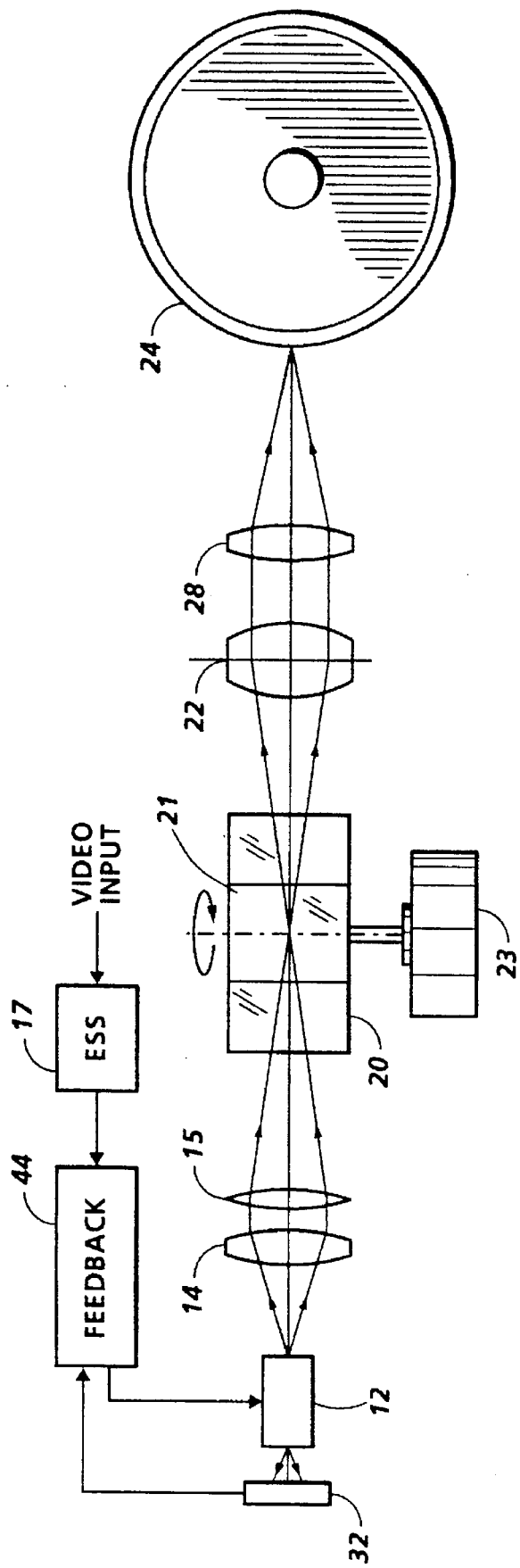
FIG. 1 is a side perspective view of a prior art dual beam ROS scanning system showing back facet power monitoring for two laser diodes.
Figure 10:
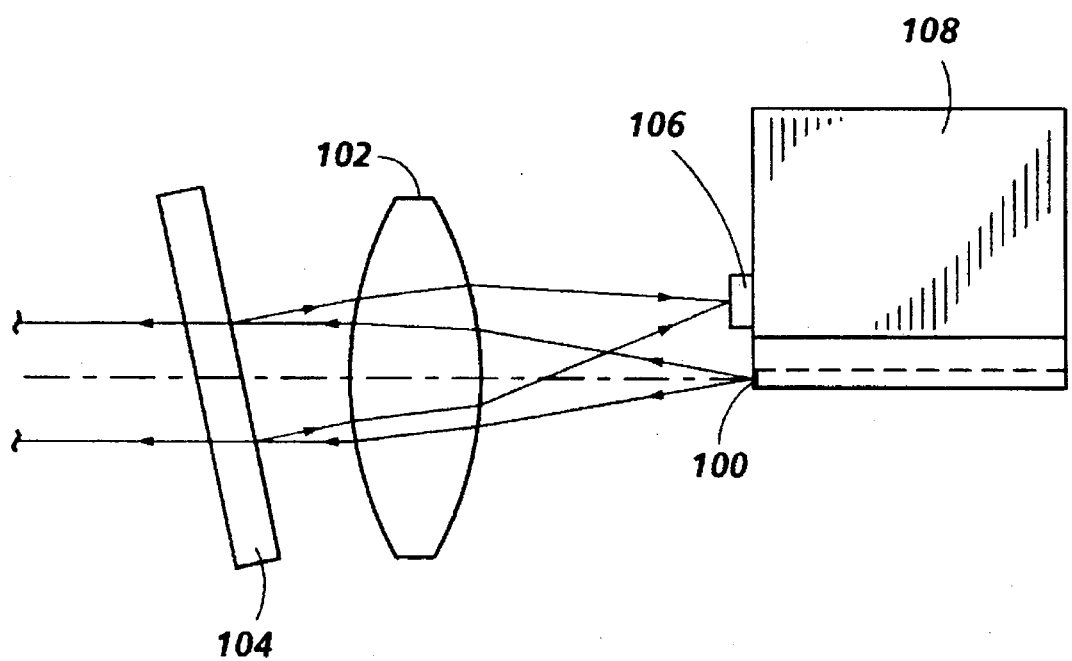
FIG. 10 shows a top view of another embodiment of the invention wherein the output of a single laser diode is monitored by a single photodiode which detects light reflected back by a tilted beam splitter member.
Figure 11:
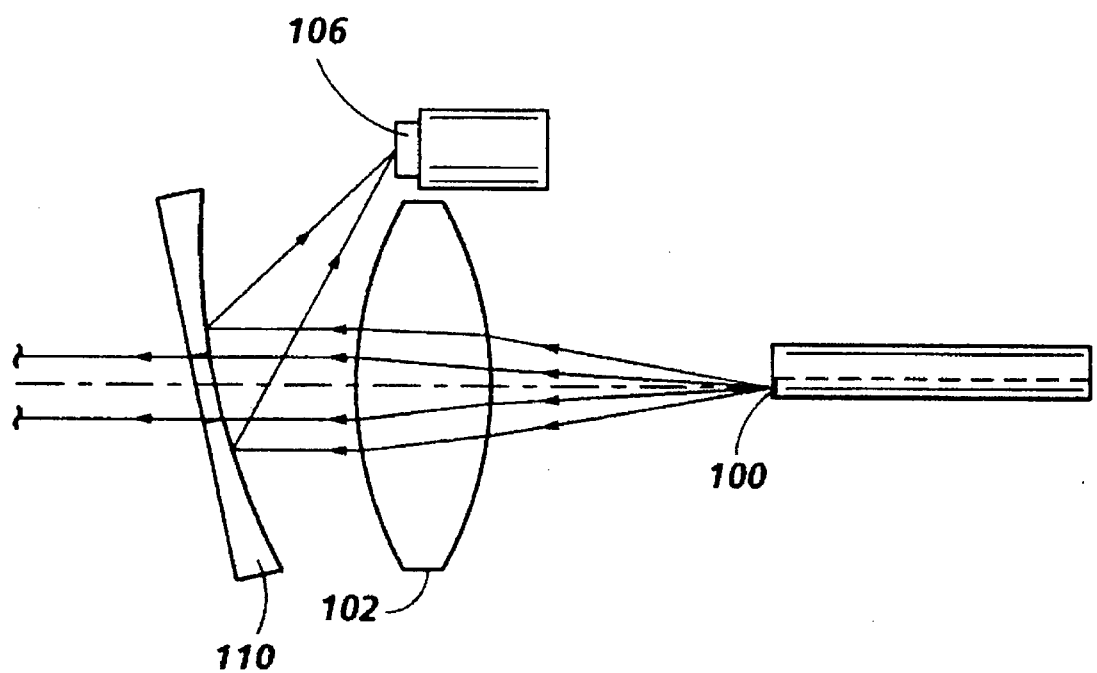
FIG. 11 is an alternate embodiment of FIG. 10 which uses a curved aperture plate to reflect light back towards the photodiode positioned adjacent to the collimator lens.

All of these embodiments are directed towards an improved apparatus and method for monitoring and controlling the light output of two laser diodes in a dual beam scanning system. The invention can also be used in systems where a single diode is to be monitored. FIG. 10 shows a top view of a scanning system wherein a single laser diode is used to provide the scanning beams for the scanner of FIG. 1, in the context of the FIG. 1 type of system, albeit with a single beam emittor. In this embodiment, a light beam from a single emittor laser diode 100 is collimated by collimator lens 102. The collimated light rays are partially reflected backwards along the optical path by tilted beam splitter 104 to impinge on photodiode 106 mounted on heat sink 108. Photodiode 106 can be equivalent to the Motorola MRD500 detector used as the preferred detector for the FIGS. 2-4 embodiment. The distance from the laser diodes to the center of photodiode 106 is about 1 mm. Beam splitter 104 is tilted in an angle of about 5.7° to re-image a portion of the laser diode collimated light onto the photodiode. The feedback circuit can be the same circuit 72 referenced, supra. A variation of this detection system would be to replace the beam splitter with an aperture plate 80 shown in FIG. 5. In another variation shown in FIG. 11, the photodiode can be moved to the position adjacent to the collimator lens and a portion of the collimated light reflected back as shown by the curved aperture plate 110. This arrangement is similar to the FIG. 8 embodiment except that a single laser diode and a single photodiode are used.

While the embodiment disclosed herein is preferred, it will be appreciated from this teaching that various alternative, modifications, variations or improvements therein may be made by those skilled in the art, which are intended to be encompassed by the following claims:

What is claimed is:

1. In a scanning optical system for scanning an image plane with a modulated first laser beam from a first laser diode, said first laser diode providing said first output beam at a first predetermined power level, said first output beam collimated by a collimator lens and scanned by a beam scanner through beam shaping optics and onto the imaging plane, the scanning optical system further including a monitoring network for monitoring and adjusting said first laser diode power level, said monitoring network including:

an optical reflective element positioned between the collimator lens and the beam scanner so as to reflect a portion of said collimated first laser beam back towards said first laser diode;

a first detector positioned to intercept at least a portion of said first laser beam reflected from said optical reflector element, said first detector for generating a first output signal that is related to the amount of said reflected first laser beam that is intercepted; and a feedback circuit for monitoring said first output signal and for adjusting said first laser diode so as to maintain the first output beam at said predetermined first power level;

wherein the optical reflective element is a beam splitter angled to reflect collimated light back toward said first laser diode and wherein said first detector is a photodiode which is mounted adjacent to said first laser diode.

2. The scanning system of claim 1, further including a second laser diode that emits a second output beam at a second predetermined power level wherein said second output beam is collimated by said collimator lens and scanned by said beam scanner through beam shaping optics and onto the imaging plane, and wherein said monitoring network further includes:

a second detector positioned to intercept at least a portion of said second laser beam reflected from said optical reflector element, said second detector for generating a second output signal that is related to the amount of said reflected second laser beam that is intercepted;

wherein said feedback circuit monitors said second output signal and adjusts the power output of said second laser diode to maintain the second predetermined power level; and wherein said first output beam is polarized in a first plane and wherein said second output beam is polarized in a second plane and wherein said first detector has an associated polarizer with its axis of transmission parallel to the direction of polarization of the first output beam and wherein said second detector has a polarizer with its axis of transmission parallel to the direction of polarization of the second output beam.

3. The apparatus of claim 2 wherein said first and second laser diodes have outputs which are both polarized in the same plane and wherein said first detector has an associated polarizer with its axis of transmission perpendicular to the direction of polarization of the output of said first and second laser diodes and wherein said second photodiode has an associated polarizer with its axis of transmission parallel to the direction of polarization of the outputs of said first and second laser diodes, said apparatus further including a half wave plate positioned between one of said laser diode outputs and the collimator lens, thereby preventing the light output of said one laser diode from being sensed by both photodiodes.

4. The scanning system of claim 2 wherein said second detector is adjacent said second laser diode.

* * * * *